July 26, 1966  J. S. GREENBERG  3,263,230
DATA COLLECTION SYSTEM EMPLOYING CELESTIAL
RADIATION AS A REFERENCE
Filed Oct. 25, 1963  2 Sheets-Sheet 1
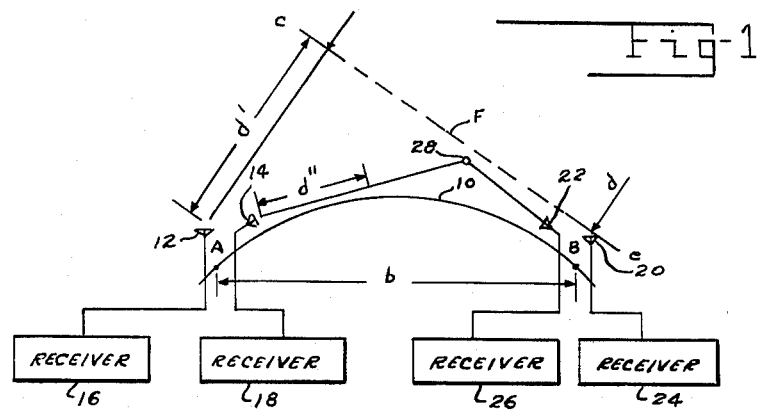
Fig-1
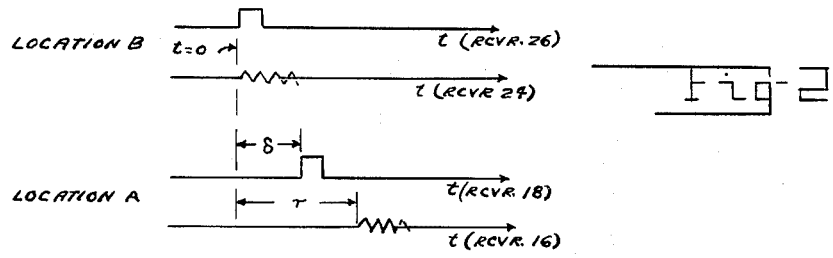
Fig-2
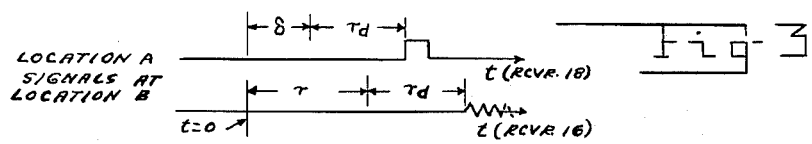
Fig-3
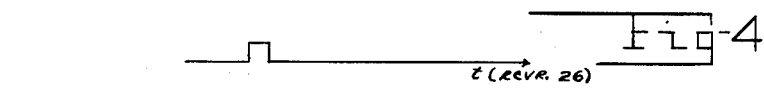
Fig-4
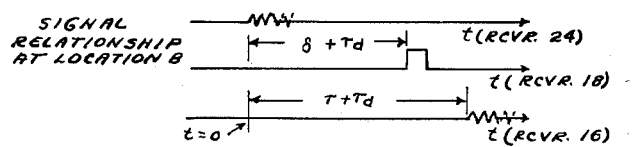
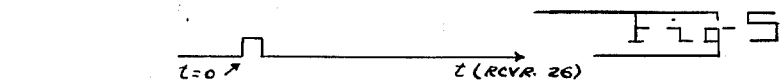
Fig-5
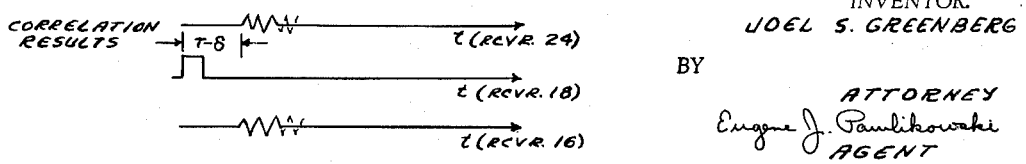
INVENTOR.
JOEL S. GREENBERG
BY
Eugene J. Paulikowski
ATTORNEY
AGENT July 26, 1966  J. S. GREENBERG  3,263,230
DATA COLLECTION SYSTEM EMPLOYING CELESTIAL
RADIATION AS A REFERENCE
Filed Oct. 25, 1963  2 Sheets-Sheet 2

INVENTOR.
JOEL S. GREENBERG
BY
ATTORNEY
Eugene J. Pawlikowski
AGENT

3,263,230
DATA COLLECTION SYSTEM EMPLOYING CELESTIAL RADIATION AS A REFERENCE

Joel S. Greenberg, Trenton, N.J., assignor to the United States of America as represented by the Secretary of the Air Force
Filed Oct. 25, 1963, Ser. No. 319,083
3 Claims. (Cl. 343—100)

The invention described herein may be manufactured and used by or for the Government for governmental purposes without the payment to me of any royalty thereon.

This case relates to data collection systems and, particularly, to a target tracking system which employs the radiation from a celestial body to synchronize points on the earth's surface whose geographical separation prevents direct microwave communication.

In data collection systems as, for example, satellite or missile tracking applications, the ground receivers or tracking stations which form an integral part of the tracking link are normally separated geographically an extent preventing line-of-sight microwave communication. Precise synchronization in time without providing a highly accurate timing standard at each site is therefore difficult to achieve. Certain systems employ synchronization signals dispatched over conductors in the ground communications circuit to furnish a time reference by which the operation of the receivers may be synchronized. However, sizable amounts of delay-introducing impedances present in the conductors detrimentally affect technological adaptations made to reduce time reference errors.

Accordingly, one object of the invention is to provide a high resolution time reference system for stations on the earth's surface separated by a considerable distance.

Another object of the invention is the provision of a highly accurate timing system which relies on the stability and permanence of celestial phenomena for deriving time difference information.

Other objects and features of the invention not specifically mentioned will be revealed in the course of the following detailed description of a specific embodiment thereof when read in connection with the appended drawings, in which:

FIG. 1 is a geometric presentation in accordance with the invention for illustrating the principles of using celestial phenomena in establishing a time reference for distance measurement;

FIGS. 2, 3, 4 and 5 show waveforms as they would appear in the preferred embodiment of FIG. 6;

Figure 6:
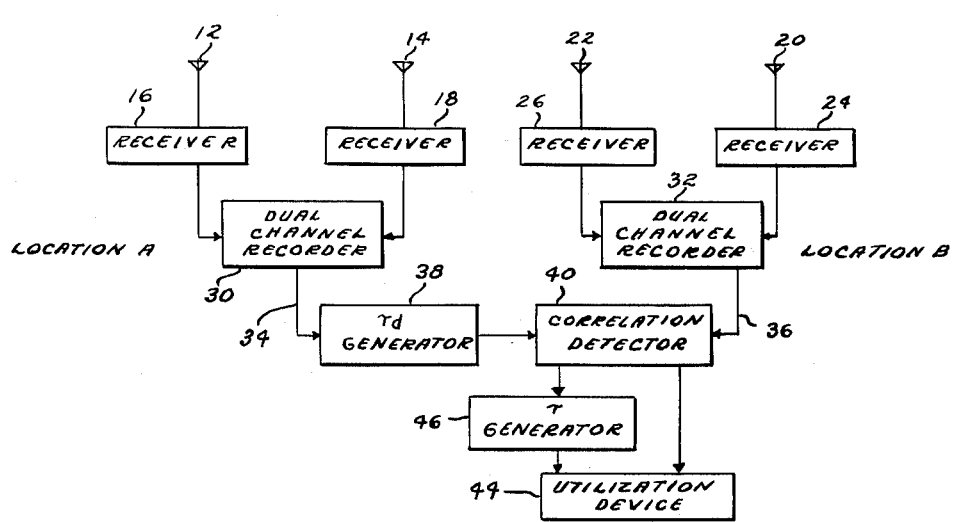
FIG. 6 is a block diagram presentation of related units arranged, in a preferred manner, to carry out time reference coordination; and, FIG. 7 is a second geometric illustration helpful in further understanding the invention method of establishing a time reference.

In FIG. 1, two ground coordinate locations A and B for which a common time reference is desired are separated by a section 10 of the earth's curvature to the extent that no direct microwave propagation between the two locations is possible. Disposed at location A are two receiving antennas 12 and 14 for passing incident radiation to receivers 16 and 18, respectively. At location B antennas 20 and 22 are similarly disposed and feed into receivers 24 and 26, respectively. A baseline distance $b$, defined by a plane intersecting the earth at the sites indicated, extends between the two locations. It will be understood that the baseline distance is many times greater than the separation between a particular pair of antennas at each location. From knowledge of the earth's dimensions and the ground-coordinate information respecting locations A and B, determination of distance $b$ is readily possible.

One of the conditions which must be observed for the application of the invention method of obtaining a time reference from data reaching widely separated locations is that the radiation from a celestial body which has been chosen as the reference point must be visible from both ground locations. It is well known that radiation from a celestial body approaches the earth's atmosphere with approximate uniformity. Also, such radiation is not limited to one characteristic frequency but occurs over a band of frequencies in the microwave portion of the spectrum. This radiation has been termed broad-band noise or, as frequently heard, "white noise." It is therefore sufficient for the purposes of this specification to state that cosmic or celestial noise is comparable to microwave radiation and has an energy distribution over a wide band of frequencies which can be detected. In view of the numerous definitions for this phenomena it will be apparent that "cosmic noise," "white noise," "celestial radiation," and "free atmospheric radiation" each in itself is not limiting, but may be used interchangeably. However, for the most part the term "celestial radiation" will be adopted in the following description.

As shown in FIG. 1, a front F of earth-bound celestial radiation from a celestial body observable simultaneously from locations A and B is represented by the line $c$–$e$. After travelling a distance $d$, which is assumed to extend outwardly to the solar or stellar body adopted as the point source of radiation, the wave front reaches location B. After propagating an additional distance $d'$, the wave front reaches location A thereby covering a total distance $d+d'$. Taking $c$ as the velocity of light, the time, $\tau$, for covering the additional distance $d'$ may be given by the relation $\tau = d'/c$.

Because of the extreme breadth of the spectrum of celestial radiation it becomes necessary to adjust receivers 16 and 24 to accept only those frequencies of energy incident on antennas 12 and 20 which fall within a part of the frequency spectrum. Such limiting of the bandwidth by the receiving system is entirely possible merely by adjustment of selectivity characteristics in the receivers. Antennas 14 and 22 are, on the other hand, proportioned to possess a very high degree of directivity so as to have no effective interaction with the celestial radiation front. These antennas are made sufficiently directive so as to be effectively shielded from direct celestial radiation. This permits antennas 14 and 22 to extract maximum energy from the reflected or transmitted components from targets as, for example, the target 28, within their associated directive patterns.

As will be observed in the case illustrated, when the target is nearer to location B than location A, signals reaching antenna 14 at location A from target 28 must travel a greater distance $d''$ than simultaneously-generated waves which reach antenna 22 at location B. An expression of this additional distance may be given by the relation $$\delta = \frac{d''}{c}$$

where $\delta$ is the relative time difference of arrival of target signal data incident on antennas 14 and 22. This actually determines the time the data was reached at location A relative to location B.

Various conventional arrangements exist for target detection within the zone of interest. A target-transported transceiver set to respond to interrogative signals sent from a ground transmitter is one suitable choice. Alternatively, standard radar ranging systems may be employed. In either case, whether the waves arising in the course of target scanning be direct signals or echoes the waves may, for simplicity, be considered as pulses having a known frequency spectrum. For isolation of the celestial radiation signals and target-returned signals in the receivers, it is necessary to exclude the frequencies of the target signals from the frequencies to which receivers 16 and 24 are tuned.

Referring now to FIGS. 2 through 5, the waveforms shown therein are approximations of those that would appear in the invention embodiment of FIG. 6 and are illustrative of the operational sequence in deriving the relative time delay $\delta$. Specifically, FIG. 2 shows signals which arise in the respective receivers associated with each antenna at locations A and B. Only a few cycles of celestial radiation are illustrated for purposes of simplification. The upper two waveforms of FIG. 2 represent pulses of celestial and target-returned energy passing into receivers 24 and 26, respectively. The lower two waveforms of FIG. 2 show the energy incident on the antennas at location A. The leading edges of the target signals are separated by a time interval $\delta$ whereas the celestial radiation signals are separated by the time interval $\tau$. It may be assumed from the relative inclinations of the celestial and target radiation patterns shown in FIG. 1 that, for targets visible from both ground locations, $\tau > \delta$.

Having considered the time distinctions which apply to the possible radiation patterns at both locations as a result of celestial and target radiations, let it be assumed that the particular two forms of waves which reach each location are applied to dual channel recorders 30 and 32, as shown in FIG. 6. That is, the target signal returns emerging from receiver 18 and the celestial radiation signals emerging from receiver 16, and the emerging target signal at receiver 26 and the celestial radiation at receiver 24, are recorded in the order of their arrival with respect to $t = 0$. The outputs of recorders 30 and 32 are fed over lines 34 and 36, respectively, each line representing a multi-track recording medium as, for example, a tape or other well-known recording medium. As is common practice, dual channel recording may be accomplished by employing multi-track tape with the data being either displaced laterally across the width dimensions of the tape or, on the other hand, displaced in frequency. In the latter case the individuality of the two channels is preserved by recovering the information at a later time by appropriate filtering.

The celestial radiation signals recorded by the recorder at one of the locations are cross-correlated and compared with the celestial radiating signals recorded at the other location as one step toward completing the determination of the relative time interval $\delta$. To this end, the recorded celestial and target signals on either of lines 34 and 36 may be arranged for transmission over suitable media to the other location. On the other hand, the light of best practice may dictate that the two dual-record channels be coupled to a mutually acceptable site which is at neither of the two locations. Bearing in mind that several ways of proceeding with the correlation are possible, let it be assumed that the dual-channel information on output line 34 at location A is coupled to location B, such as over any suitable ground circuit. The signal transfer occurs in such a manner that the celestial and target radiation signals, upon their arrival at location B, are delayed slightly according to the distance between the two locations. Let the notation $\tau_d$ represent the time which elapses in getting the dual channel record from recorder 30 to location B. FIG. 3 shows the relationship of the signals from receivers 16 and 18 with the interval $\tau_d$ included as explained. As may be seen, the celestial and target radiation signals passed through receivers 16 and 18 are further delayed with respect to zero time by an amount equal to the interval $\tau_d$.

A clearer understanding of the relative time picture of the various signals as they would appear at location B may be had from FIG. 4. In the alignment therein shown, the upper two waveforms conform to the target and celestial radiation signals arising initially in receivers 26 and 24, respectively, and are merely the upper two waveforms of FIG. 2 repeated. The lower two waveforms of FIG. 4 correspond identically to the two waveforms shown in FIG. 3 except that the individually contributing time intervals shown separately in FIG. 3 are lumped conveniently into intervals of $\delta + \tau_d$ and $\tau + \tau_d$. The time delay $\tau_d$ as it affects the operation of the invention arrangement illustrated in FIG. 6 is shown produced by a $\tau_d$ generator referenced 38 in simplified form. It will be understood, however, that the delay $\tau_d$ arises not because of the action of any particular element in the invention embodiment but merely because of the geographical separation of locations A and B. It will be appreciated that under ordinary circumstances the delay interval $\tau_d$ becomes greater or less as the distance between the locations increases or decreases, respectively.

Analyzing briefly the relative time picture which FIG. 4 affords, the waveforms serve to illustrate the intervals separating the celestial and target radiation signals as the signals appear when the normal propagation delay $\tau$ and $\delta$ and the additional delay $\tau_d$ are taken into account. It is therefore sufficient to state that the waveform alignments in FIG. 4 represent all readings obtained and recorded as a function of the amounts of the three delay parameters $\delta$, $\tau$ and $\tau_d$ when compared to the reference point $t = 0$.

Celestial and target radiation signals as delayed by the increment $\tau_d$ and matching the lower two waveforms of FIG. 4 are applied to one input of a correlation detector 40. The celestial and target radiation signals recorded at location B are applied by line 36 to the other input terminal of detector 40, it being understood that the latter two signals have the same time relationship as the upper two waveforms of FIG. 4. The process of correlation, as referred to hereinabove, is defined for purposes of this specification, as the operation of determining the filtered product of two time functions. The time functions involved in the preferred embodiment are those of the celestial radiation signals only. The function of detector 40 is to cross-correlate the celestial radiation signals in such manner that a signal having an amplitude proportional to the interval $\tau + \tau_d$ of the celestial radiation signals is produced, essentially by the point-by-point multiplication and averaging of the two signals. Correlation detectors are well known to those skilled in the art, and no claim herein is directed to the structure thereof. A mathematical statement of the correlation function $$R(\beta) = 1/T \int^T f_1(t) + f_2(t+\beta) dt \qquad (1)$$

where $f_1$ and $f_2$ are the two signals of interest, T is the maximum duration of concern of the two signals, and $\beta$ is the relative displacement of the two signals in time. In Equation 1 the product $R\beta$ represents the delay interval $\tau + \tau_d$. It is known in correlation detection studies that the filtered output of the product of two series of pulses having a fixed time relationship and frequencies relatively close together will have a maximum amplitude determined by the pulse time relationship. The evaluation of the correlation function can be accomplished by either digital or analog techniques according to standard practice. The filtered product of detector 40 which follows when the celestial radiation signals are correlated is proportional to the delay interval $\tau + \tau_d$ and is evidenced by a sharp peak limited by the time relationship. The invention contemplates the application of the filtered product as a bias potential to act upon the recorded signals to reposition the target signal data taken from receivers 16 and 18 relative to the data taken from receivers 24 and 26. The correlation detector 40 is so arranged and constructed to employ a bias product proportional to the interval $\tau + \tau_d$ in a manner to remove the time difference noted in FIG. 4 between the celestial radiation signals and simultaneously to time shift the target radiation signal initially arising in receiver 18 an amount equal to the value $\tau + \tau_d$. Following the correlation, the two target radiation signals only are taken from detector 40 in a revised time relationship best shown in FIG. 5. As seen in FIG. 5, the interval between the target radiation signals has been reduced by the amount $\tau + \tau_d$ to create a relatively shorter interval $\tau - \delta$. The equation $$\tau + \tau_d - (\delta + \tau_d) = \tau - \delta \qquad (2)$$

is a simplified explanation of the effect of the biasing potential resulting from the correlation of the celestial radiation signals. Equation 2 also expresses the realignment of the target radiation waveforms which FIG. 5 illustrates.

One channel of target signal data at the output of detector 40 is coupled directly to a utilization device 44. It will be understood that while the interval $\tau_d$ is eliminated in any comparison made at the output terminals of detector 40, the interval $\tau$ remains as a factor. Therefore, when extreme accuracy is not a requirement and an error on the order of several hundredths of a second is tolerable, it is permissible to retain the interval $\tau$ as a factor in the time relationship of the target signals. When, however, precision accuracy is demanded, the interval $\tau$ represented in the target data readout may be cancelled by introducing an equalizing signal of the same magnitude as the interval $\tau$ in a manner which will now be described.

Figure 7:
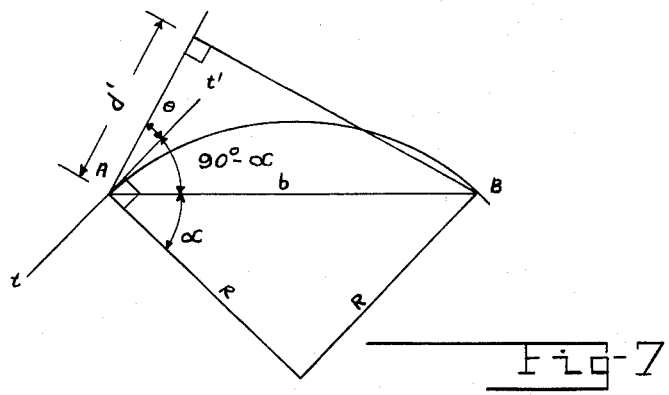

It will be recalled that the interval $\delta$ is the true quantity of interest which is the measure of the difference of the arrival times at locations A and B of the target radiation signals. In fully carrying out the determination of the delay reference is made to the geometric illustration of FIG. 7. As seen in FIG. 7 an angle $\theta$ is subtended by a line extending from location A in the direction of the reference celestial body and a line $t-t'$ drawn tangent to the earth at location A and may readily be obtained, in a conventional manner, by celestial sightings. Since $\theta$ will vary according to the celestial body selected as the stellar reference the path length of celestial radiation reaching location A will show a corresponding variation. The delay $\tau$ therefore is a function of $\theta$. Moreover, once determined, $\theta$ may be a variable because of the earth's rotation or treated as a constant, depending on the accuracy desired. With $\theta$ known, it is readily possible to determine the interval $\tau$ and to insert a proper correctional bias potential equal to $\tau$ to a predetermined one of the target signals obtained from detector 40 in a sense to reposition the target data signals relative to $t=0$ by an amount $\tau$.

Determination of the interval $\tau$ may be understood readily from geometric considerations applicable to FIG. 7. Given the distance $b$ as previously mentioned and the earth's radius R, a solution of the angle $\alpha$, thereafter a fixed quantity, readily suggests itself. With $c$ a constant, $\theta$ known, and observing simple right triangle considerations, the relation $$\tau = d'/c = b/c \cos(90° - \alpha + \theta) \qquad (3)$$

is easily derived.

Suitable computer apparatus well known in the art may be employed for supplying the value of $\tau$ in accordance with Equation 3. This apparatus in the description herein is represented by a $\tau$-generator 46 which converts the computed value of $\tau$ to a bias potential effective to advance the target radiation signal emerging originally from receiver 18 by the factor $\tau$, thereby reducing the interval between the target radiation signals from detector 40 to the desired quantity $\delta$. Utilization device 44 is adopted to produce the delay $\delta$ in suitable signal form and thereby derive a time reference index for position determination as, for example, by long base-line interferometer techniques to determine which pieces of the data were collected at the same absolute time.

It will be obvious that $\tau$-generator 46 might well be connected to the other output terminal of detector 40 and adapted to produce a bias potential whose polarity is such as to now restore the target signal data from receiver 20 by the increment $\tau$ to bring about a relationship based only on the desired interval $\delta$. These and other methods of introducing proper bias potentials for incrementally causing time shifts are well known to those skilled in the art.

In summary, the invention demonstrates a system whereby data signals developed at widely separated locations on the earth's surface and having no line-of-sight relationship may be synchronized for tracking purposes with freedom from installing and calibrating a highly accurate timing standard at each location.

Although only a single embodiment of the invention has been illustrated and described, it will be obvious to those skilled in the art that various changes and modifications can be made therein without departing from the spirit of the invention or the scope of the appended claims.

I claim:

1. Apparatus for generating a representation of a time interval in the form of a signal synchronizing two ground locations separated geographically an extent preventing line-of-sight transmission between the locations, said apparatus comprising: first and second signal receiving means disposed at one of the locations, the former to receive target radiation signals from aerial targets in the region between the locations and the latter to receive radiation from a predetermined celestial body visible from both locations, third and fourth signal receiving means disposed at the other location, the former to receive radiation signals from said target and the latter to receive celestial radiation from said celestial body, said first and third receiving means being sufficiently directive so as to have effectively no interaction with celestial radiation, said second and fourth receiving means having a band pass rejecting incoming energy at target signal frequencies, said first and second receiving means when the target is nearer said one location being arranged and constructed to provide time-coincident target and celestial radiation signals referenced to zero time, said third and fourth receiving means when the target is nearer said one location being arranged and constructed to provide target and celestial radiation signals displaced from zero time by different amounts thereby defining first and second time intervals expressing the delays between the particular pairs of target and celestial radiation signals, first dual-channel recording means coupled to said first and second receiving means for recording the time coincidence of the signals emerging therefrom, second dual-channel recording means coupled to said third and fourth receiving means for recording the time displacement of the signals emerging therefrom, means for transferring the dual-channel output of said second recording means to said one location whereby following completion of the transfer the target and celestial radiation signals initially emerging from said third and fourth receiving means are further delayed with respect to zero time an amount defining a third time interval, correlation detection means receiving the dual-channel output of said first recording means and the further-delayed dual output of said second recording means for time shifting a predetermined one of the target radiation signals an amount which reduces the time interval therebetween to an amount defining a fourth time interval proportional to the difference between said first and second time intervals, means coupled to the output of said correlation detection means for time shifting a predetermined one of the target radiation signals emerging from said correlation detection means by an amount which reduces the time interval between the target radiation signals to that amount equal only to said first time interval, and utilization means receiving said target radiation signals as corrected to only said first time interval.

2. Apparatus for generating a representation of a time interval in the form of a signal synchronizing two ground receiving locations separated geographically an extent preventing line-of-sight transmission between the locations, said apparatus comprising:

first and second antennas disposed at one and the other of the locations, respectively, to receive radiation originating from a predetermined luminous celestial body visible from both locations, third and fourth antennas disposed at said one and other locations, respectively, adapted to receive signals from targets within an aerial zone between said locations and being sufficiently directive so as to be effectively shielded from celestial radiations, receiving means coupled to each antenna for producing, at the one location nearest the target, target and celestial radiation signals which are coincident with respect to zero time and, at the other location, producing target and celestial radiation signals occurring later with respect to zero time by different amounts which define first and second time intervals, respectively, first dual channel recording means coupled to the two receiving means at said one location for recording the coincident target and celestial radiation signals emerging from the receiver means associated with said third and first antennas, respectively, second dual channel recording means coupled to the two receiving means at said other location for so recording the target and celestial radiation signals emerging from the receiver means associated with the respective fourth and second antennas that their displacement from zero time remains unchanged, means for transferring the dual output of said second recording means to said one location whereby both of the transferred target and celestial radiation signals are further delayed with respect to zero time by an amount which defines a third time interval equal to the transmission time, correlation detection means receiving the dual output signals of said first and second recording means for generating a bias product proportional to the sum of said second and third time intervals which time shifts the target radiation signal emerging from the receiving means associated with said fourth antenna an amount equal to the sum signal thereby creating between said target radiation signals a fourth time interval defined as the difference between said first and second intervals, means coupled to the output of said correlation detection means for generating a corrective bias potential proportional to said second time interval to time shift a predetermined one of the target radiation signals emerging from said correlation detection means an amount which reduces the time interval between the target radiation signals an amount equal only to said first time interval, and utilization means receiving said target radiation signals for producing an index of said first time interval.

3. A method of measuring a time interval representing the difference in arrival times of target signals at two ground locations separated geographically an extent preventing line-of-sight transmission, where the target is nearer to one of the locations than the other, comprising the steps of receiving at each location target signal energy, receiving at each location celestial radiation emitted by a predetermined luminous celestial body visible from both locations, recording the target and celestial radiation signals emerging from each location, transferring the pair of signals recorded at the location farthest from the target to the location nearest the target, cross-correlating the celestial radiation signals until they are aligned in time thereby generating a bias product proportional to combined delays representing the difference of the arrival times of the celestial radiation signals at the locations and the delay introduced by the transfer of said pair of signals, employing the bias product to realign the pair of target radiation signals an amount which reduces the time interval therebetween to an interval representing the difference between said different arrival times of the celestial radiation signals and the difference between the arrival times of the target radiation signals at the locations, and time shifting a predetermined one of the target radiation signals by an amount equal to said different arrival times of the celestial radiation signals thereby deriving an output signal proportional only to the interval which is the difference between the arrival times of the target radiation signals at the locations.

References Cited by the Examiner

UNITED STATES PATENTS

| 3,137,854 | 6/1964 | Anderson | 343—112 |
| 3,171,126 | 2/1965 | Wiley | 343—112 |

CHESTER L. JUSTUS, *Primary Examiner.*

R. E. BERGER, *Assistant Examiner.*